United States Patent [19]
Erlandson

[11] 3,960,624
[45] June 1, 1976

[54] METHOD OF FABRICATING TUBULAR BODIES

[75] Inventor: Paul M. Erlandson, Palos Park, Ill.

[73] Assignee: Continental Can Company, Inc., New York, N.Y.

[22] Filed: Nov. 13, 1974

[21] Appl. No.: 523,480

[52] U.S. Cl. .............................. 156/69; 93/39.1 R; 93/55.1 R; 93/80; 93/94 R; 156/74; 156/189; 156/257; 156/272; 156/573; 219/121 LM
[51] Int. Cl.² .......................................... B29C 27/14
[58] Field of Search ............... 156/69, 74, 272, 573, 156/257, 189; 93/36.5 R, 39.1 R, 55.1 R, 80, 94; 117/105.4; 219/121 LM

[56] References Cited
UNITED STATES PATENTS

| 3,156,401 | 11/1964 | Krause | 93/80 |
|---|---|---|---|
| 3,400,029 | 9/1968 | Mesrobian et al. | 156/82 |
| 3,430,410 | 3/1969 | Heisler | 93/39.1 R |
| 3,555,976 | 11/1971 | Carter | 93/80 |
| 3,756,128 | 9/1973 | Armstrong et al. | 93/80 |
| 3,756,894 | 9/1973 | Shugart | 93/39.1 R |
| 3,769,117 | 10/1973 | Bowen et al. | 156/69 |
| 3,790,744 | 2/1974 | Bowen | 156/272 |
| 3,798,094 | 3/1974 | Costa | 156/69 |
| 3,819,403 | 6/1974 | Hogstrom | 117/105.4 |

*Primary Examiner*—Edward G. Whitby
*Attorney, Agent, or Firm*—Diller, Brown, Ramik & Wight

[57] ABSTRACT

This disclosure relates to a method of fabricating tubular bodies having at least one closed end by advancing material along a predetermined path of travel in a predetermined direction, forming the material into a tube during its advancement, placing a closure in-line with the advancement of the tube, and utilizing the motion of the advancing tube to assemble the latter with the closure.

18 Claims, 12 Drawing Figures

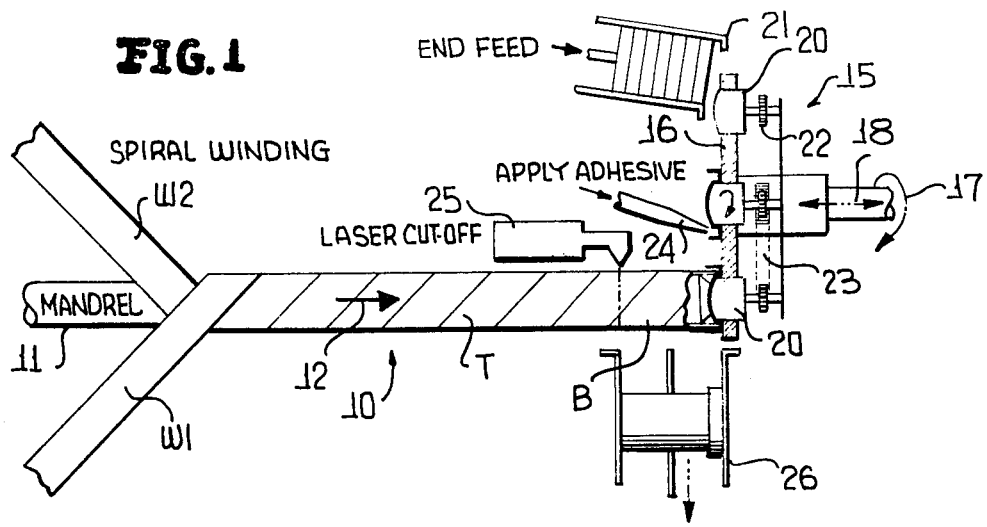
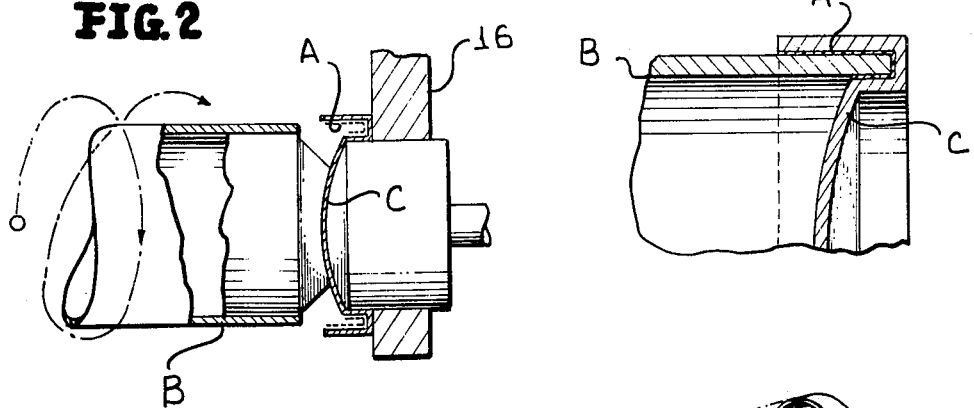
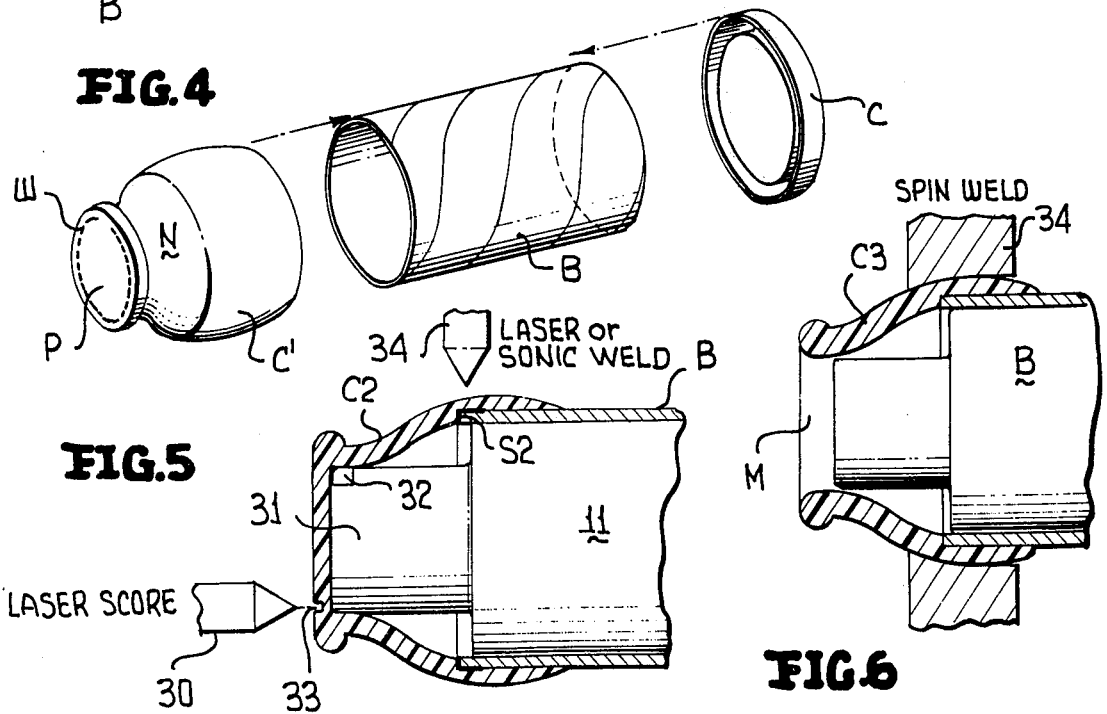

METHOD OF FABRICATING TUBULAR BODIES

The present invention is directed to the fabrication of tubular bodies, particularly can bodies, by utilizing the force of the forward advancement of a formed tube to assemble the latter with a closure to form container bodies.

Container bodies are conventionally fabricated in many ways, such as welding or soldering side seams of blanks formed into tubes, forming spiral wound bodies from webs of materials, continuously welding web material to form a tube cutoff into individual tubular sections, and the like. In all of these cases the eventually formed tube is continually advanced, and after the completion of each tubular section or body the same are transferred to a closing machine at which closures or end units are applied thereto in various fashions, such as by double seaming operations, crimping operations, adhesive application operations, or the like. Typical of such tube formation is that disclosed in the patent to Robert B. Mesrobian U.S. Pat. No. 3,400,029 entitled METHOD OF MAKING SPIRAL WOUND CONTAINER BODIES, assigned to the present assignee. In such and analagous systems no utilization whatever is made of the advancement of the tube during its fabrication.

In keeping with the present invention a tube is manufactured in any of numerous manners, such as the spiral winding heretofore noted, and during the same the tube is advanced toward a closure placed in-line therewith. The advancement of the tube thus brings and end thereof into contact with the closure for the assembly of the latter components to each other. In this manner, contrary to known end-to-body assembly systems the motion of the tube is employed advantageously, and in so doing conventional and cost related steps are avoided as, for example, the necessity of providing separate and distinct apparatus to achieve tube to end unit assembly.

In further keeping with this invention the tube is preferably severed by a laser beam or like high frequency energy source such that eventually severed sections are continually advanced by the overall tube during its manufacture. This achieves back-up contact between the formed tube and the sections severed therefrom to permit the force of the advancing tube to act through the tube sections to advance the same with respect to each associated closure for the assembly therebetween.

In further keeping with this method an appropriate adhesive is applied to the tube sections and/or end units prior to the assembly therebetween, and in the case of a tube formed by a spiral winding operation the natural rotational motion of the tube causes the adhesive to be rotationally swirled or moved between the tube and the closure to assure a hermetic seal upon the bonding, curing, setting or the like of the adhesive between the components.

In keeping with the foregoing object the step of applying the adhesive between the tube and closure may be done prior to, during or for that matter after the assembly of the these components to each other, and in cases where the closure is formed of transparent material a high energy light beam may be employed to adhere the closure and tube together by setting or curing the adhesive therebetween.

IN THE DRAWINGS

FIG. 1 is a highly schematic view of an apparatus constructed in accordance with this invention for performing the method thereof, and illustrates the manner in which a tube is cutoff into tubular sections with the advancement of the tube being utilized to assemble each tubular section with an associated closure.

FIG. 2 is a fragmentary enlarged side elevational view of a portion of FIG. 1, and illustrates the the manner in which the advancement and rotation of the severed tubular section results in the insertion thereof into a channel of an associated closure.

FIG. 3 is an enlarged fragmentary sectional view of a portion of the assembled closure and tubular body.

FIG. 4 is an exploded view of components which can be assembled in accordance with this invention to form a container.

FIG. 5 is a fragmentary sectional view illustrating a closure which may be scored during the assembly of the latter to a tubular body.

FIG. 6 is a fragmentary sectional view illustrating the manner in which a closure may be spin welded to a tubular body.

Figure 7:
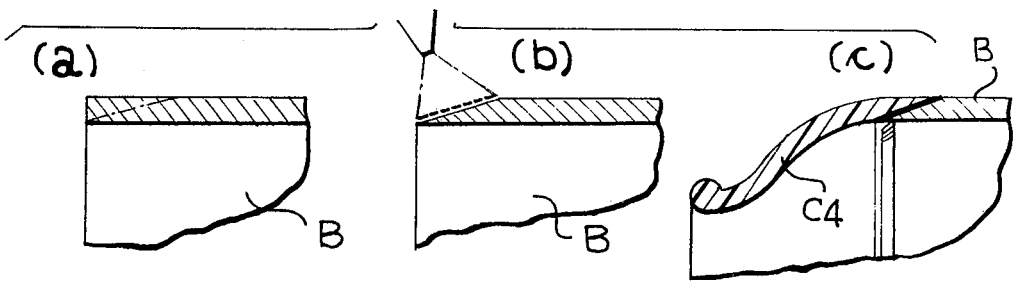
FIGS. 7 (a through c) illustrate successive steps in the practice of the present method including the skiving of the tubular body and the assembly thereof to a skived closure.

In keeping with the novel method of this invention an apparatus or machine 10 is provided for fabricating tubular bodies having at least one closed end. In the illustrated embodiment of the invention the apparatus 10 is a conventional spiral winding machine of the type more specifically disclosed in the latter-noted patent to Robert B. Mesrobian et al. (U.S. Pat. No. 3,400,029), and includes a mandril or horn 11 upon which webs W1, W2 are wrapped in a spiral fashion and advanced from left-to-right, as indicated by the arrow 12 by conventional means, such as the belt 37 of the latter-noted patent. The webs W1, W2 are drawn from rolls (not shown) of flexible material, such as paper, laminations thereof with polymeric or copolymeric material, and they have pre-applied or applied during assembly a suitable adhesive to form a generally cylindrical tube T which is advanced from left-to-right, as viewed in FIG. 1, toward a closure or end unit assembly mechanism, generally designated by the reference numeral 15.

The mechanism 15 includes a turret 16 which is rotated and/or indexed by conventional means (not shown), as is indicated by the reference numeral 17. The mechanism 15 is further reciprocated in a direction parallel to the direction of travel of the tube T, as is indicated by the reference numeral 18. The reciprocal motion imparted to the mechanism 15 and/or the turret 16 may be, for example, a conventional barrel cam such as that disclosed in commonly assigned U.S. Pat. No. 3,581,542 in the name of Richard O. Wahler et al., entitled APPARATUS FOR AND METHOD OF NECKING IN END PORTIONS OF TUBULAR MEMBERS.

Depending upon the speed of operation of the apparatus 10 the mechanism 15 includes a plurality of holders 20 disposed about its periphery in a typical turret fashion, such as that disclosed in commonly assigned U.S. Pat. No. 3,548,769 in the name of Robert F. Windstrup et al., entitled MACHINE FOR FORMING CANS FROM CLOSED END TUBULAR MEMBERS. However, in this case, each holder 20 is contoured to receive thereupon an end unit or closure C (FIG. 2) from a hopper 21. The holders 20 may retain the closure C thereon by the use of appropriate conventional magnetic means, through a vacuum, or the like. Each holder 20 includes a shaft 21 carrying a gear 22 about which is entrained a chain 23 driven by conventional means (not shown) to impart rotation to each closure C in order that an adhesive A (FIG. 2) may be applied thereto by a conventional adhesive applicator 24 (FIG. 1).

As the tube T is advanced toward the particular holder 20 carrying an associated closure C the tube T is cut-off into a tubular body or section B by a high energy source, such as a conventional laser or maser cut-off mechanism 25. Such cut-off mechanisms 25 are extremely fast acting and though each body B is severed from the tube T the two remain in contact and therefore the advancement of the tube T to the right in FIG. 1 advances the severed body B into contact with the closure C while the closure C is backed up by its associated holder 20 during the introduction of the body B thereinto. Appropriate means are provided for synchronising the advancement of the tube T to the right and the reciprocation, indicated by the reference numeral 18, of the mechanism 15 such that the tube T is fully seated within the closure C and retraction or motion of the mechanism 15 to the right takes place in such a fashion to assure that the body B is neither deformed under excessive advancement force during the assembly operation or is not fully seated within the closure C due to lack of efficient advancement force of the tube T.

Depending upon the specific nature of the adhesive A, a partial curing operation may occur while the components are being assembled or thereafter, but in either event the eventually assembled body B and closure C are discharged by conventional means into a conveyor 26 for subsequent processing.

Reference is particularly made to FIG. 2 which illustrates the advancement of the tube section or body B in a rotational or spiral fashion as a result of the spiral winding of the tube T. Due to this spiral rotation the end (un-numbered) of the body B as it is advanced into the closure C contacts the adhesive A and swirls or rotates the adhesive A to ensure its entire distribution about contacting surfaces of the body B and the closure C. This assures, upon the bonding or curing of the adhesive A, that a strong and hermetic seal is achieved between the closure C and the body B.

Referring to FIG. 4, assuming that the closure C has been united to the body B in the manner described heretofore relative to FIGS. 1, 2, and 3, after the discharge of the thus assembled body and closure and its conveyance for subsequent processing an opposite closure C' may be applied thereto or, ultimately, the closure C' could be assembled to the body B in lieu of the closure C by the apparatus 10 and thereafter the closure C can be applied to the body B in a conventional manner. Thus irrespective of which end of the body B may be in the final analysis considered top or bottom any one of the closure C, C', or other closures to be described hereinafter may be applied to the body B by the apparatus 10. For example, if the closure C' and like closures are fed by the mechanism 15 to an "in-line" position the same may be assembled to the associated body B in the manner described relative to FIG. 1 with respect to the assembly of the closures C to the bodies B. In FIG. 4 the closure C' is formed of polymeric or copolymeric material with a removably or tear-out panel P being molded relative to a remaining neck portion N of the closure C' thereby forming a line of weakening W therebetween. This permits the tear-out panel P to be readily removed along the line of weakening W after the total assembly and, of course, packaging of the container.

In further keeping with this invention another laser mechanism 30 may be provided downstream of the point of assembly of a closure C2 relative to a tubular body B by the mechanism 15. The laser mechanism 30 would be disposed generally between the turret 16 and a special end 31 of the mandril 11 housing a conventional laser sensing unit 32. By appropriate synchronism between the turret and closure C2 a momentary space may be provided therebetween after the assembly to permit the laser beam to form the score line 33. Additionally, the closure C2 may include a shoulder S between which is disposed adhesive (un-numbered) for uniting the closure C2 to the body B. Another conventional laser mechanism or a sonic welding gun 34 may be utilized to cure or set the adhesive to hermetically and rigidly unite the body B to the closure C2.

Another modification of the embodiment of the invention disclosed in FIG. 1 is illustrated in FIG. 6 wherein a closure C3 having an open mouth M is united to the body B by conventional spin welding apparatus, generally designated by the reference numeral 34. The apparatus 34 may include means (not shown) for rotating one or more clamping jaws which grasp the closure C3 and rotate the same in a direction opposite to that of the direction of the rotation of the body B to create sufficient heat to fuse the closure C3 to the body B. In this case the closure may be, for example, constructed from polyethylene or similar polymeric or copolymeric material.

FIGS. 7 (a through c) illustrate the manner in which the body B of FIG. 7a is initially of a square-ended configuration (solid lines) yet may be skived along the broken line through the utilization of the laser mechanism 25 of FIG. 1 (also shown in FIG. 7b) prior to the application thereto of a similarly mirror-imaged skived closure C4 (FIG. 7c). In lieu of the laser mechanism 25 for performing the severing and skiving operation simultaneously a conventional skiving mechanism may be located upstream of the laser mechanism 25 to skive the body B in a conventional manner prior to the assembly thereto of the closure C4.

Figure 8:
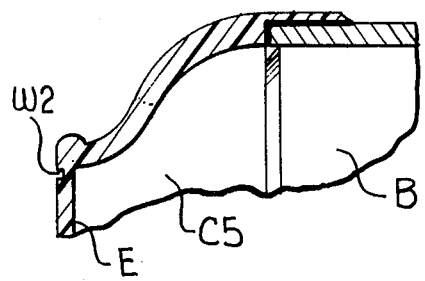
FIG. 8 is a fragmentary sectional view of another tubular body and closure, and illustrates a shoulder on the closure united by adhesive to an end of the tubular body.
Figure 9:
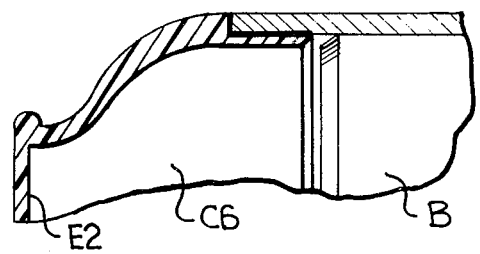
FIG. 9 is a fragmentary sectional view of another tubular body and closure, and illustrates the latter as having a radially outwardly opening peripheral shoulder.

In lieu of either the closures C' or the closure C2, both of which include a tear-out panel, a closure C5 (FIG. 8) may be assembled to the body B through the operation of the apparatus 10 of FIG. 1. In this case the closure C5 has an integral end panel E with a weakening line W2 preformed therein. Thus, in accordance with this aspect of the invention the closure C5 need not undergo laser scoring by a mechanism such as that at 30 in FIG. 5, but need only be assembled to the body B in the manner heretofore described relative to the closure C and the body B of FIGS. 1 through 3.

In a like manner another closure C6 having no weakening line and a closed end E2 may be likewise applied to the body B in accordance with the operation heretofore described of the apparatus 10 of FIG. 1.

Figure 10:
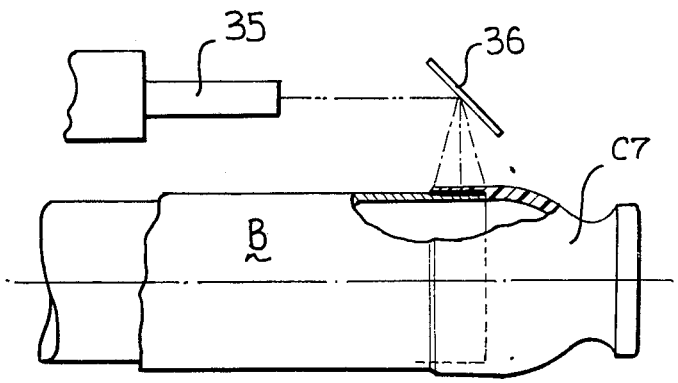
FIG. 10 is a fragmentary side elevational view of a united closure and transparent cover, and illustrates the use of a high intensity source of light energy to cure an adhesive between the closure and tubular body.

If the closure applied to the body or tube B or T, respectively, is formed of transparent material, such as a closure C7 of FIG. 10, a source 35 of high intensity energy, such as a conventional laser mechanism, may be utilized to direct its rays through a mirror 36 against a transparent peripheral portion of the closure C7 to thus bond the adhesive disposed therebetween to the body B.

Figure 11:
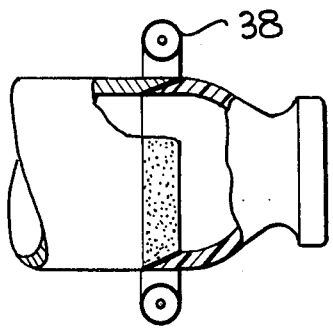
FIG. 11 is a fragmentary side elevational view of another tubular body and closure, and illustrates the manner in which an adhesive therebetween may be cured by passage through an induction coil or other similar high source of electrical energy.

As an alternative the body B when secured through a curable adhesive to the closure may be bonded by the passage of the assembled body and closure through a conventional induction heater, such as a coil 38 (FIG. 11) which would be located downstream of the point of assembly between the closure and tubular body.

Figure 12:
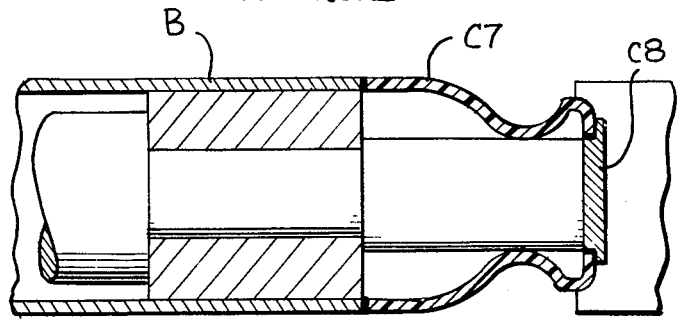
FIG. 12 is a fragmentary axial sectional view of another assembled tubular body and closure, and illustrates the manner in which the closure includes a separate removable cap.

FIG. 12 illustrates the manner in which a closure C7 has an open mouth (un-numbered) closed by separate cap C8 which is united by a butt joint to the body B. In this case the assembled closure C7 and the cap C8 are united prior to being fed to appropriately contoured holders, corresponding to the holders 20, of the mechanism 15 and are indexed to a position in-line for butt engagement by the terminal edges of the succeeding tubular bodies B.

While preferred forms and arrangements of parts have been shown in illustrating the invention, it is to be clearly understood that various changes in detail and arrangement of parts may be made without departing from the spirit and scope of this disclosure.

I claim:

1. A method of fabricating tubular bodies having at least one closed end comprising the steps of advancing material along a predetermined path of travel in a predetermined direction, forming the material into a tube during its advancement, disposing a closure in-line with the advancement of the tube, and utilizing the motion of the advancing tube to assemble the latter with the closure.

2. The fabricating method as defined in claim 1 including the step of scoring the tube to form a tubular body after the step of tuilizing the advancement of the tube to assemble the latter with the closure.

3. The fabricating method as defined in claim 1 including the step of severing the tube to form a tubular body before the step of utilizing the advancement of the tube to assemble the tubular body with the closure.

4. The fabricating method as defined in claim 1 including the step of severing the tube to form a tubular body during the step of utilizing the advancement of the tube to assemble the latter with the closure.

5. The fabricating method as defined in claim 1 including the step of supportively backing up the closure during the step of utilizing the advancement of the tube to assemble the latter with the closure.

6. The fabricating method as defined in claim 1 wherein the tube forming step is performed by a spiral winding operation.

7. The fabricating method as defined in claim 1 wherein the assembling step includes the step of providing relative rotation between the advancing tube and closure.

8. The fabricating method as defined in claim 1 including the step of applying adhesive between the tube and closure prior to the assembly thereof to each other.

9. The fabricating method as defined in claim 1 including the step of applying adhesive between the tube and closure prior to the assembly thereof to each other, and performing the assembling step by providing relative rotation between the advancing tube and closure whereby the adhesive is rotationally spread therebetween.

10. The fabricating method as defined in claim 1 including the steps of applying adhesive between the tube and closure prior to the assembly thereof to each other, and employing an external energy source for setting the adhesive to bond the tube and closure to each other, 11. The fabricating method as defined in claim 1 including the step of severing by a laser the tube to form a tubular body before the step of utilizing the advancement of the tube to assemble the tubular body with the closure.

12. The fabricating method as defined in claim 1 including the step of severing by a maser the tube to form a tubular body before the step of utilizing the advancement of the tube to assemble the tubular body with the closure.

13. The fabricating method as defined in claim 2 wherein the tube forming step is performed by a spiral winding operation.

14. The fabricating method as defined in claim 3 wherein the tube forming step is performed by a spiral winding operation.

15. The fabricating method as defined in claim 4 wherein the tube forming step is performed by a spiral winding operation.

16. The fabricating method as defined in claim 5 wherein the tube forming step is performed by a spiral winding operation.

17. The fabricating method as defined in claim 6 including the step of skiving the tube prior to assembling the latter to the closure.

18. The fabricating method as defined in claim 8 wherein the adhesive applying step is performed by applying a powder adhesive to the tube and/or closure prior to assembly thereof, and curing the adhesive by a high energy light beam to adhere the closure and tube together.

* * * * *